US008698750B2

(12) United States Patent
Malabuyo

(10) Patent No.: US 8,698,750 B2
(45) Date of Patent: Apr. 15, 2014

(54) INTEGRATED HAPTIC CONTROL APPARATUS AND TOUCH SENSITIVE DISPLAY

(75) Inventor: Paolo Malabuyo, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 774 days.

(21) Appl. No.: 12/233,429

(22) Filed: Sep. 18, 2008

(65) Prior Publication Data

US 2010/0066681 A1 Mar. 18, 2010

(51) Int. Cl.
G06F 3/02 (2006.01)

(52) U.S. Cl.
USPC .............................. 345/169; 463/37

(58) Field of Classification Search
USPC ........................................ 345/169
See application file for complete search history.

(56) References Cited

U.S. PATENT DOCUMENTS

| 6,942,571 | B1 | 9/2005 | McAllister et al. | |
| 7,084,858 | B2* | 8/2006 | Anson | 345/169 |
| 7,084,884 | B1 | 8/2006 | Nelson et al. | |
| 7,199,787 | B2* | 4/2007 | Lee et al. | 345/169 |
| 2003/0038821 | A1 | 2/2003 | Kraft | |
| 2003/0174072 | A1 | 9/2003 | Salomon | |
| 2004/0075676 | A1* | 4/2004 | Rosenberg et al. | 345/701 |
| 2004/0090416 | A1 | 5/2004 | Biheller et al. | |
| 2005/0162398 | A1 | 7/2005 | Eliasson et al. | |
| 2006/0040740 | A1* | 2/2006 | DiDato | 463/37 |
| 2006/0073862 | A1* | 4/2006 | Shinoda et al. | 463/1 |
| 2006/0121965 | A1 | 6/2006 | MacIver | |
| 2006/0170669 | A1 | 8/2006 | Walker et al. | |
| 2006/0281550 | A1* | 12/2006 | Schena | 463/37 |
| 2007/0120828 | A1* | 5/2007 | Fyke | 345/169 |
| 2007/0162875 | A1* | 7/2007 | Paquette et al. | 715/847 |
| 2007/0195010 | A1* | 8/2007 | Toriumi et al. | 345/1.3 |
| 2007/0218995 | A1 | 9/2007 | Didato | |
| 2007/0229478 | A1 | 10/2007 | Rosenberg et al. | |
| 2007/0236470 | A1 | 10/2007 | Abanami et al. | |
| 2007/0236472 | A1 | 10/2007 | Bentsen et al. | |
| 2008/0092087 | A1 | 4/2008 | Brown et al. | |
| 2008/0119237 | A1 | 5/2008 | Kim | |
| 2009/0073126 | A1 | 3/2009 | Srivastava | |
| 2011/0032189 | A1 | 2/2011 | Travis | |

FOREIGN PATENT DOCUMENTS

| EP | 1025886 A2 | 8/2000 |
| JP | 2003015796 A | 1/2003 |
| JP | 2003241897 A | 8/2003 |

(Continued)

OTHER PUBLICATIONS

ISA Korea, International Search Report of PCT/US2009/057049, May 6, 2010, 5 pages.

(Continued)

Primary Examiner — Quan-Zhen Wang
Assistant Examiner — David Lee
(74) Attorney, Agent, or Firm — Micah Goldsmith; Glen Johnson; Micky Minhas

(57) ABSTRACT

The provision of a haptic input with an integrated touch screen input is disclosed. One disclosed embodiment provides a control apparatus for an electronic device. The control apparatus comprises a haptic input mechanism configured to provide haptic feedback responsive to a push input, and an integrated touch sensitive display forming a surface of the haptic input mechanism, wherein the touch sensitive display comprising a touch-sensing mechanism.

17 Claims, 3 Drawing Sheets

(56) References Cited

FOREIGN PATENT DOCUMENTS

| JP | 2004094389 A | 3/2004 |
|---|---|---|
| JP | 2008516312 A | 5/2008 |
| WO | 03021922 A1 | 3/2003 |
| WO | 2008082095 A1 | 7/2008 |

OTHER PUBLICATIONS

Karlson, et al., "One-Handed Touchscreen Input for Legacy Applications", Proceeding of the twenty-sixth annual SIGCHI conference on Human factors in computing systems, 2008, pp. 1399-1408.

Lamberti, et al., "An Accelerated Remote Graphics Architecture for PDAs", Proceedings of the eighth international conference on 3D Web technology, Saint Malo, France, 2003, 7 pages.

Ashley, Bryon et al., "Changing Icons on User Input Device," U.S. Appl. No. 13/53,636, filed Jul. 19, 2012, 29 pages.

"Cyborg M.M.O.7 Gaming Mouse," Mad Catz Interactive Asia Limited, http://cyborggaming.com/prod/mmo.htnn, Retrieved Mar. 6, 2012, 5 pages.

"YOYO Games," YoYo Games, http://sandbox.yoyogames.com/games/79320#, Made available on Apr. 24, 2009, 5 pages.

"DC Image Button 3.3," Pelagian Softwares, http://www.uniqueidea.net/DC-Image-Button-software__13820.html, Retrieved Mar. 6, 2012, 3 pages.

"Sleight of hand," Bennett Ring, http://www.smh.com.au/articles/2004/12/01/1101577541136.html, Dec. 4, 2004, 3 pages.

"Interaktionsdesign," Tisdagen Den, http://1md001.blogspot.in/, Mar. 17, 2009, 10 pages.

European Patent Office, International Search Report and Written Opinion of PCT/US2013/051169, Netherlands, Oct. 8, 2013, 8 pages.

Japanese Patent Office, Office Action of Japanese Patent Application No. 2011-527906, Nov. 8, 2013, 6 pages.

* cited by examiner

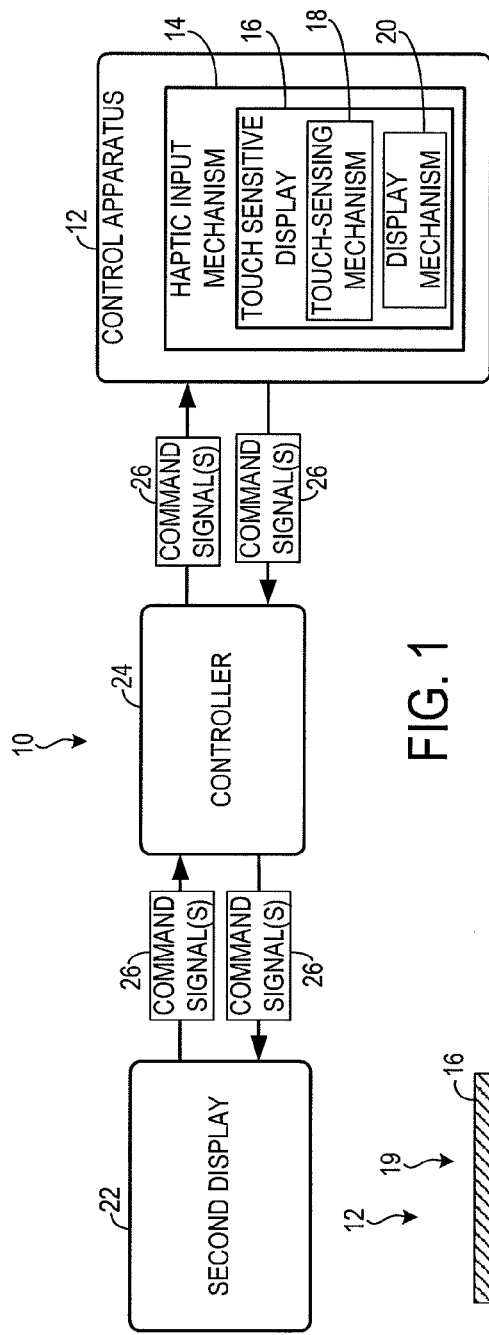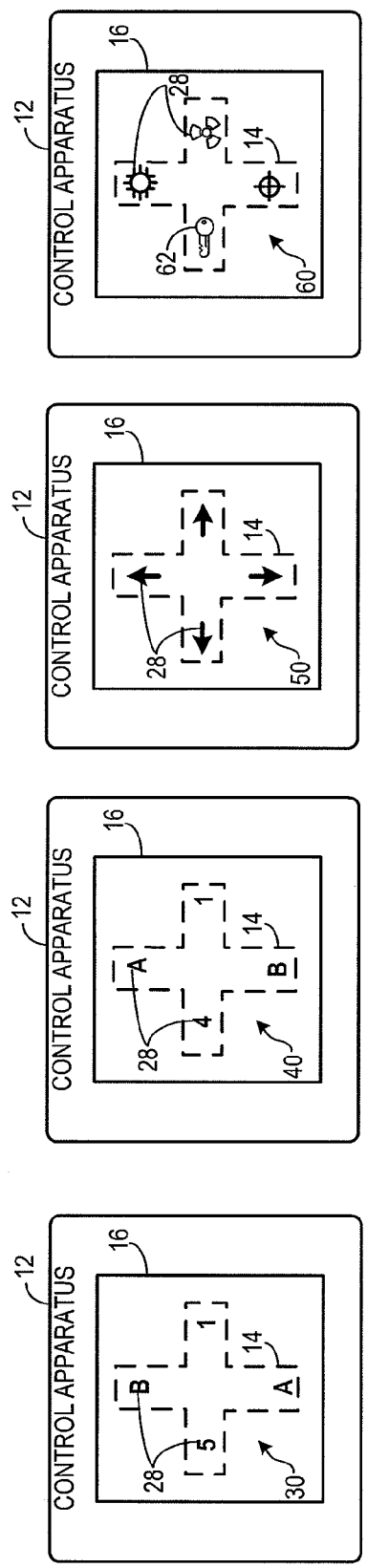

INTEGRATED HAPTIC CONTROL APPARATUS AND TOUCH SENSITIVE DISPLAY

BACKGROUND

A variety of control mechanisms may be used to control electronic devices. For example, touch screen inputs allow a user to interact directly with a screen on which commands and/or controls are displayed. Touch screens have been incorporated into an increasing number of electronic devices, which may be due, at least in part, to decreases in manufacturing costs as well as increases in functionality of the touch screen inputs. The touch screen inputs may be configured to provide a variety of layouts having a number of different functions. For example, a touch screen may visually represent and functionally perform actions associated with an application program. Furthermore, a touch screen layout may be quickly adjusted in response to an adjustment of the electronic device, increasing the interactivity and ease of use of the device.

However, touch screen inputs do not provide haptic feedback, such as that provided by directional pads, joysticks and the like. Such haptic feedback may be helpful to enable quick and accurate interaction with a control mechanism, as haptic feedback may allow a user to learn to associate various inputs with specific haptic responses. This may allow the user to operate the control mechanism without visual observation, and to determine the timing of various inputs with more accuracy than with touch screen inputs.

SUMMARY

Accordingly, various embodiments related to the provision of haptic feedback with a touch screen input are disclosed. For example, one disclosed embodiment provides a control apparatus for an electronic device. The control apparatus comprises a haptic input mechanism configured to provide haptic feedback responsive to a push input and an integrated touch sensitive display forming a surface of the haptic input mechanism, the touch sensitive display comprising a touch-sensing mechanism.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 shows a schematic representation of embodiments of an electronic device and a control apparatus for the electronic device.

FIG. 2 shows a schematic sectional view of a touch screen input and haptic input of the control apparatus of FIG. 1.

FIGS. 3-6 illustrate various example configurations of images displayed on the touch screen input of the control apparatus of FIG. 1.

DETAILED DESCRIPTION

Figure 7:
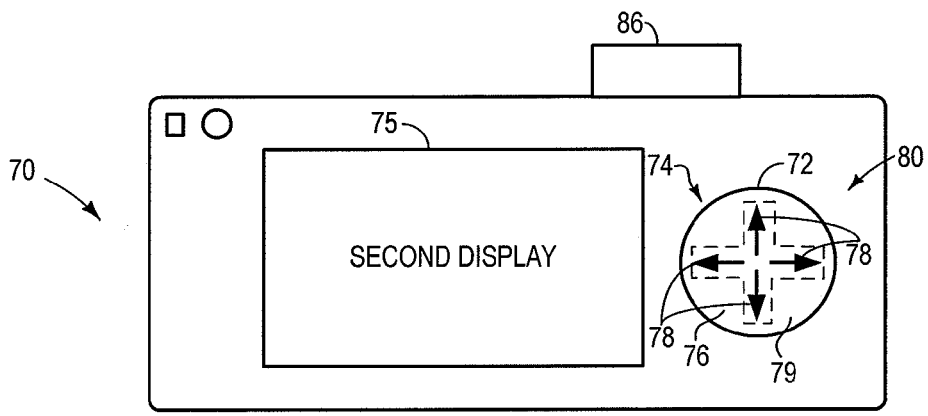
FIGS. 7-9 illustrate an embodiment of a portable electronic device in various configurations.

FIG. 1 illustrates a schematic depiction of a control apparatus 12 for an electronic device 10. The control apparatus 12 may include a haptic input mechanism 14 configured to provide haptic feedback responsive to a push input. The haptic input mechanism may comprise a directional pad, one or more button inputs, a gamepad, joystick, a sheared touch screen surface, a vibrational mechanism (e.g. rumble pad), etc. A push input may comprise physical interaction with the haptic input mechanism 14 via an appendage of a user, such as a digit, or an interactive instrument, such as a stylus. Furthermore, a spring, elastomeric button, and/or other suitable components included in the haptic input mechanism 14 may provide haptic feedback.

Haptic feedback allows a user of the control apparatus 12 to associate a haptic response with a specific function associated with actuation of the control apparatus 12, allowing for quick and accurate operation. In some examples, the user may operate the control apparatus 12 without visual aid (i.e. direct observation) utilizing haptic feedback as tactile aid.

The control apparatus 12 further comprises an integrated touch sensitive display 16 forming a surface of the haptic input mechanism 14. In one example, as illustrated in FIG. 2, the touch sensitive display 16 is positioned atop the haptic input mechanism 14 (i.e. on the surface that a user pushes), forming a top surface 19 of the haptic input mechanism 14. This allows a user to view and interact with the touch sensitive display 16 and the haptic input mechanism 14 with the same hand, and without moving the hand between the two inputs.

Continuing with FIG. 1, the touch sensitive display 16 may include a touch sensing mechanism 18 configured to sense a touch input. Any suitable touch-sensing mechanism may be used. Examples include, but are not limited to, capacitive, resistive, optical, and other such touch sensing mechanisms. The touch sensing mechanism 18 may be configured to sense a touch input from an appendage of a user, such as a digit, an interactive instrument, such as a stylus, or other suitable apparatus capable of interacting with the touch sensing mechanism. A touch input includes direct contact with the touch sensitive display 16 and/or proximate movement near the touch sensitive display 16. For example, a touch input may be performed via sliding, tapping, etc. of a digit on a surface of the touch sensitive display.

In some configurations, the touch input triggers a first function in the electronic device and the push input triggers a second function in the electronic device. Triggering a function in an electronic device may include sending command signals, implementing commanded actions in an application program executed by the electronic device, activating one or more electronic components, etc.

In one example, the application program is a gaming application program. During operation of the gaming application program, an orbital touch input may control a steering function, while a push input may control a toggle function (e.g. firing of a weapon, actuation of a horn, etc.), a scrolling function, etc. In other examples, the touch and push inputs may trigger the same function.

Returning to FIG. 1, the touch sensitive display 16 may include a display mechanism 20 configured to display objects, images, etc. Any suitable display mechanism may be used. In one example, the display mechanism 20 comprises an organic light emitting device (OLED) configured to display an image on the touch sensitive display 16. OLEDs may offer advantages over other display mechanisms due to their low profile and low power consumption compared to other displays, such as a backlit displays. However, it will be appreciated that alternate display mechanisms may be utilized to display images such and a liquid crystal display (LCD), light emitting diode (LED) display, electronic paper (e-paper) displays, thin film transistor (TFT) display, etc. In another embodiment, an electronic paper display may be used in display mechanism 20. The use of electronic paper may allow the manufacture of a lower cost system than an OLED. Additionally, optical waveguides may direct light from a location within the electronic device onto the touch-sensitive surface of the display mechanism 20.

The control apparatus 12 may further include a second display 22 spaced apart from the control apparatus 12. The second display 22 may be used as a primary display to present a game or other interactive content to a user. The second display 22 may be any suitable display, including but not limited to an OLED display, a liquid crystal display (LCD), light emitting diode (LED) display, as well as any of the other displays mentioned above. The second display may be configured to receive data (e.g. image data) from a controller 24, which may comprise a processor and memory containing instructions executable by the processor to perform this and other functions described herein.

It will be appreciated that the second display 22, controller 24, and control apparatus 12, may form a single electronic device sharing a common housing, each component being in electronic communication. For example, the second display 22, controller 24, and control apparatus 12 may be included in a portable electronic device such as a handheld gaming console, portable media player, etc. Likewise, other configurations of these components are possible. For example, each of the electronic components may be separate components having distinct housings, while maintaining electronic communication. Examples of such configurations include, but are not limited to, desktop computing systems, gaming consoles, etc.

Among other functions, the controller 24 may be configured to control the display of indicia on the touch sensitive display 16. FIGS. 3-6 show the touch sensitive display 16 displaying various indicia 28. The indicia 28 may include alphanumeric characters, symbols, images, or any other suitable indicia. In these figures, the haptic control mechanism 14 is illustrated schematically as a dashed line cross indicating the directions in which the mechanism is actuatable, but it will be understood that the haptic control mechanism 14 physically may have the same footprint as the touch-sensitive display 16. FIGS. 3-4 illustrate first and second example alphanumeric layouts, 30 and 40, respectively. FIG. 5 illustrates a third example layout 50 comprising arrows which symbolically represent directions a cursor, character, etc. may be moved via the directional pad. FIG. 6 shows a fourth example layout 60 displaying symbols that may correspond to specific actions a user can take in an application program via a touch or push input at the location of the indicia. It will be appreciated that many variations of the layout and/or appearance of the touch sensitive display 16 are possible, and that the depicted embodiments are shown for the purpose of illustration.

Referring to FIGS. 3-4, the touch sensitive display 16 is shown in two alphanumeric configurations, 30 and 40 respectively, with arbitrary characters shown as indicia at each actuatable direction. In this example, FIG. 3 shows the touch sensitive display 16 in a first configuration 30 before the indicia have been changed due to a triggering event, such as a physical manipulation of the control apparatus 12 or a change of an application program that is controlled by the control apparatus 12. Likewise, FIG. 4 shows the touch sensitive display 16 in a second configuration 40, at a subsequent time, after such a triggering event has occurred. As illustrated in these figures, the indicia have changed in location and appearance. Further, the indicia also may be changed in orientation, or in any other suitable manner.

In this manner, specific symbols that inform a user of an action invoked by a direction on a directional pad (or other haptic input device) may be displayed for specific application programs used with the control apparatus 12. This may help a user to learn a control layout for the application program more easily than where generic indicia are used to identify actuatable haptic controls, especially where the control apparatus 12 is used to control a wide variety of application programs. In this case, each program may have different actions associated with the haptic input mechanism 14 and the touch sensitive display 16. It may be difficult for the user to keep track of all the actions performed by the control apparatus 12 in many different application programs. Therefore, the displayed indicia and the layout of the displayed indicia may be changed with each application to correspond to the specific actions a particular application program assigns to the control apparatus 12.

As a specific example, referring to FIGS. 5 and 6, one application may utilize a directional pad to control a movement of a character, while another application may use the directional pad to control specific actions, such as an unlocking of a door. Thus, in the first instance, the indicia may comprise arrows that indicate that the directional pad controls movement, while in the second instance, a key symbol 62 may show the specific direction on the directional pad that can be actuated to perform the unlocking action. The correspondence between the indicia and the action performed may help the user quickly learn how the control apparatus is used for a specific application. This may help to allow a user with no previous knowledge of the device or application program to quickly learn to operate the controls without having to consult a manual or revisit a training process for the application.

The displayed indicia may be modified in response to any suitable event or occurrence. For example, the displayed indicia may be modified in response to a physical manipulation of the electronic device 10 and/or a change of an application program executed by the electronic device 10. Furthermore, the displayed indicia 28 may be actively updated during a touch or push input. As an example, in a driving video game, the displayed indicia may take the form of a steering wheel that visibly rotates upon input of an orbital touch motion by a user.

Returning to FIG. 1, the second display 22, controller 24, and control apparatus 12 may electronically communicate via one or more command signal(s) 26. The command signal(s) may initiate various actions in the aforementioned electronic components (i.e. the second display 22, controller 24, and control apparatus 12). The actions may include executables implemented by the hardware components and the software included in the controller 24, the second display 22, and/or the control apparatus 12. Command signal(s) may include signals configured to initiate various actions in software and hardware of associated systems. It will be appreciated that while a single control apparatus is illustrated in FIG. 1, a plurality of control apparatuses may be utilized.

Figure 8:
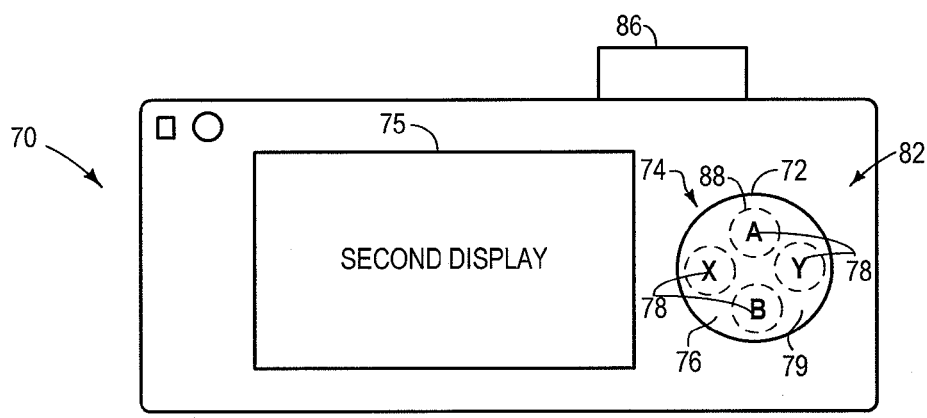
Figure 9:
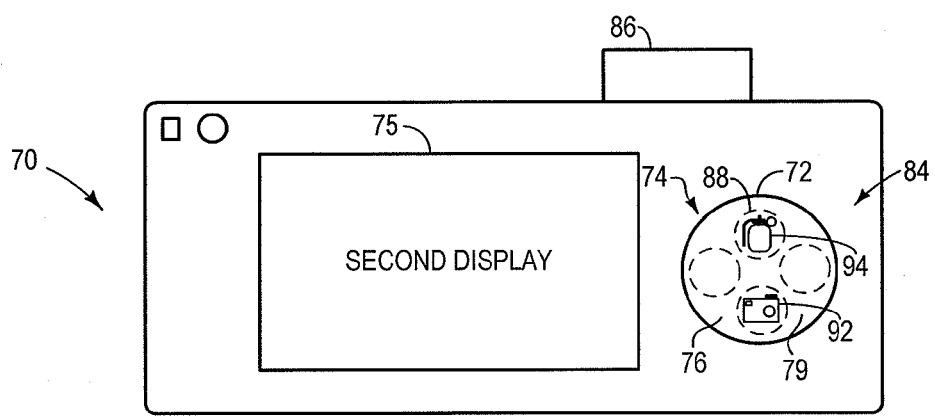

An exemplary portable electronic device 70 is illustrated in FIGS. 7-9 with different example layouts of indicia. The portable electronic device 70 includes a multi-directional control mechanism 72 in the form of a directional pad. Although a single multi-directional control mechanism is shown, it will be appreciated that a plurality of multi-directional control mechanisms may be utilized.

The multi-directional control mechanism 72 has a plurality of actuatable components 74, each actuatable component configured to provide haptic feedback in response to an input. The portable electronic device 70 also includes a second display 75 configured to display images or objects such as a video game, other audio/video content, etc. While shown in the context of a directional pad, it will be understood that the multi-directional control mechanism 72 may additionally or alternatively include a joystick, one or more buttons, etc. Furthermore, it will be understood that the second display may comprise a haptic feedback mechanism as described herein.

The portable electronic device 70 further comprises a touch sensitive display 76 configured to display one or more indicia 78, forming a surface 79 of the multi-directional control mechanism 72. FIGS. 7-9 show the control mechanism 72 with different indicia displayed on the touch sensitive display 76. First, FIG. 7 shows the multi-directional control mechanism 72 in a first example configuration 80, wherein the actuatable components 74 include displays of up, down, left, and right directional arrows indicating, for example, directions a character in a game may be moved via the multi-directional control mechanism 72. FIG. 8 shows the multi-directional control mechanism 72 in a second example configuration 82 in which the actuatable components 74 are labeled with alphanumeric indicia 78. FIG. 9 illustrates the multi-directional control mechanism 72 in a third example configuration 84, in which symbolic indicia are displayed.

The portable electronic device 70 further may include a controller 86 electronically coupled to the multi-directional control mechanism 72 and/or the touch sensitive display 76. Among other functions, the controller 86 may be configured to modify the indicia on the touch sensitive display 76 and modify the functionality of the multi-directional control mechanisms 72 in response to an event such as a physical manipulation of the portable electronic device 70 and/or a change in an application or program executed by the device. In FIGS. 7-9 the controller 86 is shown at a perimeter of the portable electronic device 70 for clarity, but it will be understood that the controller 86 may be located in any suitable location within a body of the portable electronic device 70.

The touch sensitive display 76 and the multi-directional control mechanism 72 are each configured to receive input from a user, and to provide a control signal to the controller 86 to control an action of an application, such as a game, media player, etc., executed on the portable electronic device. In some applications, the touch sensitive display 76 and the multi-directional control mechanism 72 may be configured to be actuated substantially concurrently and in response to actuation generate a single command signal (i.e. one or ore output signals that are interpreted as a single command by the controller 86), while in other applications the touch sensitive display 76 and multi-directional control mechanism 72 may provide separate control signals even when activated in a temporally overlapping manner (i.e. a plurality of output signals that are interpreted as separate commands by the controller 86).

Continuing with FIGS. 7-9, each indicium on the touch sensitive display 76 may specify a function of a corresponding actuatable component. In the example of FIG. 7, the arrow indicia show a user that the actuatable components of the multi-directional control mechanism can be used to move a character in the indicated directions. In the example of FIG. 8, the letter indicia may be used, for example, to support a legacy game in which generically labeled buttons are described in a user manual for the game. In the example of FIG. 9, the indicia comprise symbolic representations of a camera 92 and a grenade 94, which may correspond to actions that a character in a game may take (e.g. capturing a photograph of a scene in a game, and launching a grenade in a game, respectively). It will be understood that the specific embodiments herein are described for the purpose of example, and are not intended to be limiting in any manner.

While FIGS. 7-9 illustrate a portable device with both a directional control mechanism 72 with an integrated display 76, and a second display 75, it will be understood that other embodiments may comprise a single display that occupies a substantial portion of a surface of the device, and that has both a haptic input mechanism and a touch input mechanism. For example, referring to the embodiment of FIGS. 7-9, the second display 75 may include a haptic feedback mechanism (i.e. a large-area multi-directional haptic control underlying the second display 75), and the control mechanism 72 and display 76 may be omitted. Further, the display in such an embodiment may be sized to occupy substantially an entire face of the portable device.

Figure 10:
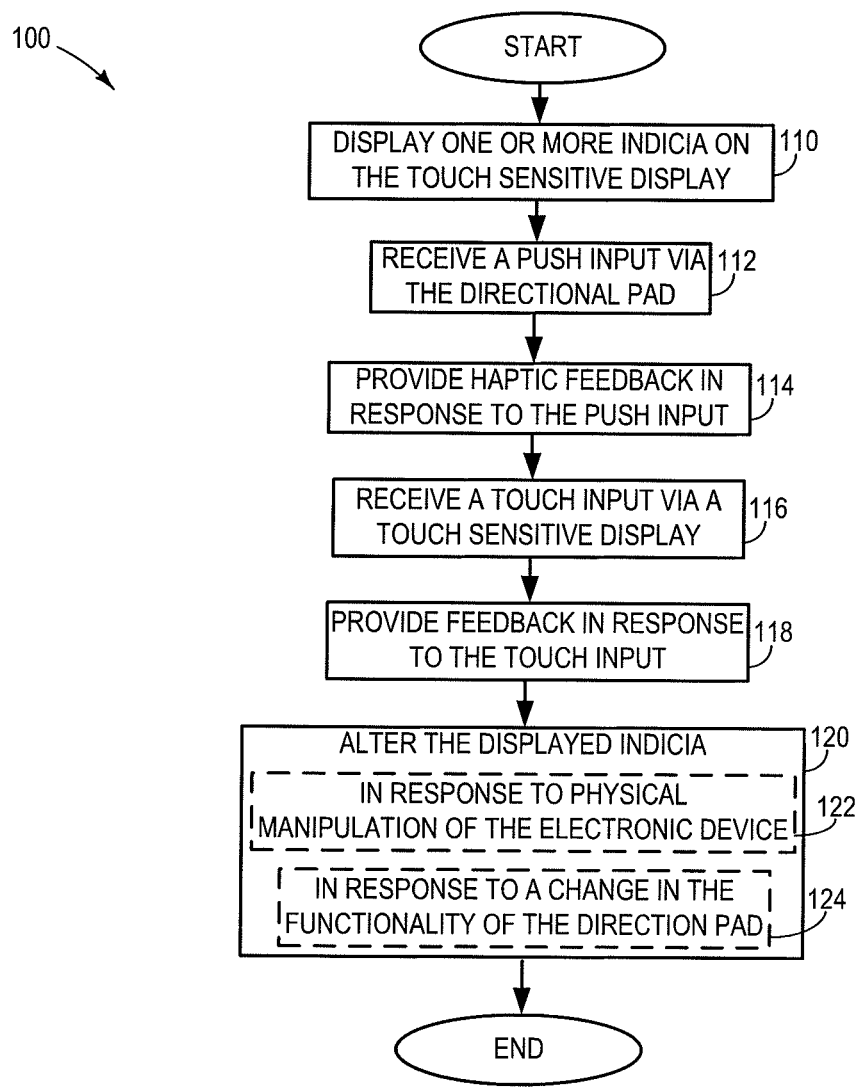
FIG. 10 shows a flow diagram depicting an embodiment of a method for operating an electronic device via a control apparatus.

FIG. 10 illustrates a method 100 for operating a user input control apparatus for an electronic device, the control apparatus having a directional pad comprising an integrated touch sensitive display, and a controller configured to receive and correlate command signals from the touch sensitive display and the moveable control mechanism. Method 100 may be implemented, for example, via instructions stored in memory and executable by a processor in a controller of the above-described embodiments, or may be implemented in any other suitable system or environment. In some exemplary embodiments a portable electronic device may be used, while in other embodiments another suitable electronic device may be used.

First, at 110, method 100 includes displaying one or more indicia on the touch sensitive display. In one example, each indicium may specify a function of a corresponding actuatable component of the directional pad, as previously discussed. At 112, method 100 further includes receiving a push input via the directional pad. A push input may include depression of the moveable control mechanism, or in other embodiments, an input via a joystick or the like. Next at 114, method 100 includes providing haptic feedback in response to the push input. Such feedback may be a "snap" sensation as a directional actuator on the directional pad is pressed, or may be any other suitable feedback.

Next, as shown at 116, method includes receiving a touch input via a touch sensitive display. Next at 118, the method includes, providing feedback in response to the touch input. Such feedback may be visual and/or aural feedback provided by an application, such as a game or media player, or may be any other suitable feedback.

Next, at 120, the method includes altering the displayed indicia on the touch-sensitive display. The displayed indicia may be altered in response to physical manipulation of the electronic device, at 122. Additionally or alternatively, the displayed indicia may be altered in response to a change in the functionality of the directional pad, at 124. Altering the display indicia may include altering an appearance, location, quantity, and/or functionality of the indicia. Further, the display indicia may be altered in response to a change of an application program associated with the control apparatus. In one example, the indicia may be altered in response to start up of an application. Further still, the displayed indicia may be altered in response to physical manipulation of the device.

Additionally, in some embodiments, the method 100 may include generating a first command signal and a second command signal in response to substantially concurrent touch inputs. Alternatively, in other embodiments, the method 100 may include generating a single command signal in response to substantially concurrent touch and push inputs, as described above. Further still, in other embodiments the method may include, generating a first command signal and a second command signal in response to asynchronous touch and push inputs.

The embodiments described herein may be implemented to enable a user to efficiently and accurately operate an electronic device. Further, the above systems and methods allow for a haptic control apparatus for an electronic device to be adapted such that the control apparatus can display indicia specifically tailored to inform a user the exact function assigned to the directions of a haptic directional control apparatus. This is in contrast to other directional pads, joysticks, etc., that may use static, generic labeling to signify the actuatable directions of the controller.

It will be understood that the embodiments described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A video game control apparatus configured to communicate with a gaming console, the video game control apparatus comprising:
   a directional pad moveable in a plurality of directions;
   a plurality of actuatable components operable by the directional pad, each actuatable component being configured to provide haptic feedback responsive to a push input in a corresponding direction of the plurality of directions;
   an integrated display forming a surface of the directional pad; and
   a controller configured to
      display an indicia on the integrated display for each direction of the directional pad, each indicia indicating a specific function associated with a corresponding direction of the directional pad depending upon a game being executed by the gaming console,
      change a specific function of each direction of the directional pad and to modify a displayed indicia for each direction of the directional pad in response to a change of the specific function associated with the corresponding direction of the directional pad based upon a change in the game being executed by the gaming console,
      receive a user input actuating a selected actuatable component; and
      send a command signal to the gaming console to cause the gaming console to output image data to a second display housed separately from the video game control apparatus in response to the user input, the image data representing an action invoked by a direction on the direction pad corresponding to the selected actuatable component.

2. The video game control apparatus of claim 1, wherein the integrated display comprises a capacitive touch-sensing mechanism.

3. The video game control apparatus of claim 1, wherein the integrated display comprises an organic light emitting device or an electronic paper device.

4. The video game control apparatus of claim 1, wherein the integrated display is an integrated touch-sensitive display, and wherein the video game control apparatus is configured such that a touch input in a selected direction on the directional pad triggers a first function in an electronic device and a push in the selected direction triggers a second function in the electronic device.

5. The video game control apparatus of claim 4, wherein triggering the first function and the second function each includes implementing a command in an application program executed by the electronic device.

6. A method for operating a video game controller, the video game controller having a directional pad moveable in a plurality of directions and comprising a plurality of actuatable components each actuatable by a press on a corresponding direction of the plurality of directions of the directional pad and also an integrated touch sensitive display, the video game controller further comprising a second display spaced from the directional pad, and a controller configured to receive and correlate command signals from the integrated touch sensitive display and the directional pad, the method comprising:
   displaying one or more indicia on the integrated touch sensitive display, each indicia indicating a specific function associated with a corresponding direction of the directional pad;
   receiving a push input via a selected actuatable component of the directional pad;
   providing haptic feedback in response to the push input;
   receiving a touch input via the integrated touch sensitive display;
   providing feedback in response to the touch input;
   changing the specific function associated with one or more of the directions of the directional pad;
   altering the displayed indicia in response to changing the specific function of the one or more directions of the directional pad; and
   updating information displayed on the second display in response to one or more of the push input and the touch input.

7. The method according to claim 6 wherein altering the displayed indicia includes altering an appearance, location, quantity, and/or functionality of the indicia.

8. The method according to claim 6, wherein the push input and the touch input are asynchronous touch and push inputs, and further comprising generating a first command signal and a second command signal in response to the asynchronous touch and push inputs, respectively.

9. The method according to claim 6, wherein the push input and the touch input are substantially concurrent touch and push inputs, and further comprising generating a single command signal in response to the substantially concurrent touch and push inputs.

10. The method according to claim 6, wherein each displayed indicium specifies a function of a corresponding actuatable component of the directional pad.

11. The method according to claim 6, wherein the displayed indicia are altered in response to a change of an application program being controlled by the video game controller.

12. The method according to claim 6, wherein the displayed indicia are altered in response to physical manipulation of an electronic device.

13. A method for operating a video game controller, the video game controller having a directional pad moveable in a plurality of directions and comprising a plurality of actuatable components each actuatable by a press on a corresponding direction of the plurality of directions of the directional pad and also an integrated touch sensitive display, the video game controller further comprising a controller configured to receive and correlate command signals from the integrated touch sensitive display and the directional pad, the method comprising:

displaying one or more indicia on the integrated touch sensitive display, each indicia indicating a specific function associated with a corresponding direction of the directional pad;

receiving a push input via a selected actuatable component of the directional pad;

providing haptic feedback in response to the push input;

receiving a touch input via the integrated touch sensitive display;

providing feedback in response to the touch input;

changing the specific function associated with one or more of the directions of the directional pad; and altering the displayed indicia in response to changing the specific function of the one or more directions of the directional pad.

14. The method according to claim 13, wherein the video game controller is in communication with a second display device having a distinct housing that is separate from the video game controller, the method further comprising updating information displayed on the second display in response to one or more of the push input and the touch input.

15. The method according to claim 13, wherein the displayed indicia are altered in response to physical manipulation of an electronic device.

16. The method according to claim 13, wherein each displayed indicium specifies a function of a corresponding actuatable component.

17. The method according to claim 13, wherein the displayed indicia are altered in response to a change of an application program being controlled by the video game controller.

* * * * *